Oct. 21, 1969 P. H. DUGAY 3,473,571
DIGITALLY CONTROLLED FLOW REGULATING VALVES
Filed Dec. 27, 1967
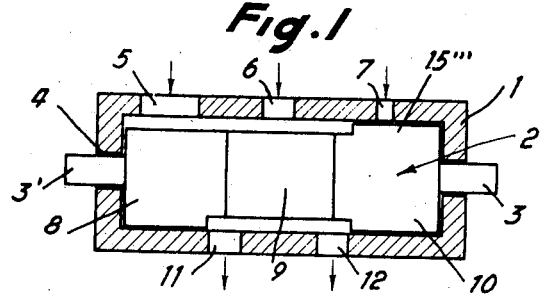
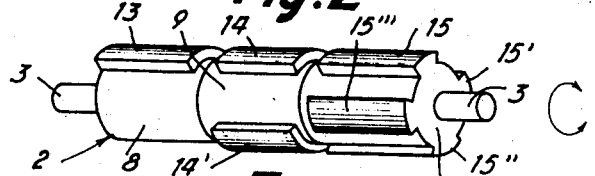
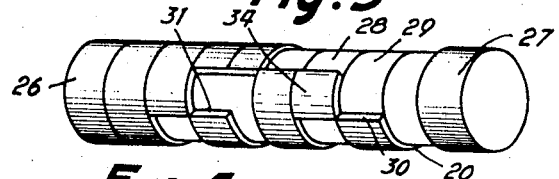
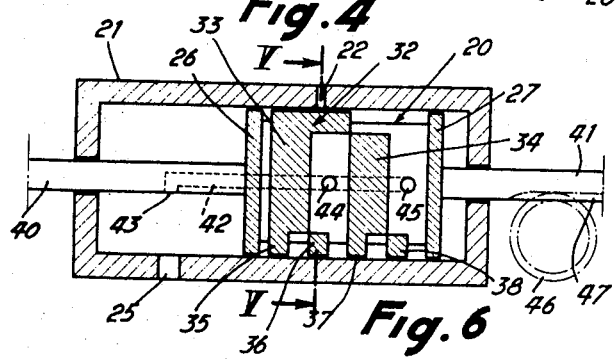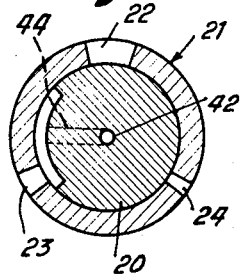
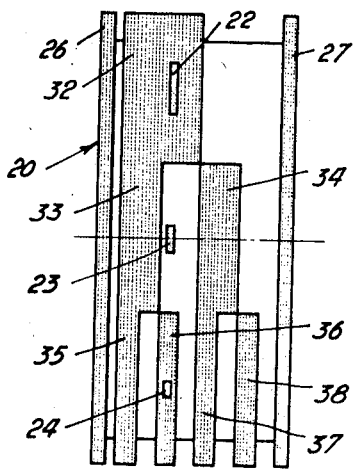

__United States Patent Office__

3,473,571
Patented Oct. 21, 1969

3,473,571
DIGITALLY CONTROLLED FLOW REGULATING VALVES
Pierre Henri Dugay, Asnieres, France, assignor to D. B. A., Paris, France, a French company
Filed Dec. 27, 1967, Ser. No. 693,854
Claims priority, application France, Jan. 6, 1967, 90,273
Int. Cl. F15c 3/02
U.S. Cl. 137—625.4                    5 Claims

ABSTRACT OF THE DISCLOSURE

Digitally controlled flow regulating valve comprising a distributor movable within a distributor body by motor means to position the distributor as a function of an order given by a digital computer, said distributor body having at least one fluid outlet aperture and N fluid inlet apertures dimensioned to deliver clearly defined flow quantities with a loss of head which is held constant, these flow quantities being equal respectively to:

$$\frac{l}{2}, \frac{l}{2^2}, \frac{l}{2^3} \ldots \frac{l}{2^N}$$

where $l$ is the total flow from the valve and N the number of digits in the order to be received by the valve, said distributor being of cylindrical section and being provided with aperture closure members arranged in such a way that during a complete movement of the distributor the N fluid inlet apertures are opened and closed in all the $2^N$ possible combinations.

---

The present invention relates to digitally controlled flow regulating valves.

In the case of equipment which makes use of a fluid as the energy source, it is often useful to provide a valve to regulate the flow of fluid and if regulation of the system is controlled by a digital computer it is important for the valve to be specially designed to take this fact into account; that is to say, the valve must itself be of the digital type in order to benefit to the utmost from the precision of the computer.

According to the present invention a digitally controlled valve comprises a distributor movable within a distributor body and by motor means, which positions the said distributor as a function of the order given by a digital computer, said distributor body having at least one fluid outlet aperture and N fluid inlet apertures dimensioned to deliver clearly defined flow quantities with a loss of head which is held constant, these flow quantities being equal respectively to:

$$\frac{l}{2}, \frac{l}{2^2}, \frac{l}{2^3} \ldots \frac{l}{2^N}$$

where $l$ is the total flow from the valve and N the number of digits in the order to be received by the valve and said distributor comprising a cylindrical section provided with aperture closure members arranged in such a way that the N fluid inlet apertures are opened and closed in all the $2^N$ possible combinations, during a complete movement of the distributor.

Preferably the motor means is of the electric stepping type.

To ensure that sealing of the inlet apertures can follow the natural order of binary notation, the distributor preferably consists of N elements arranged side by side and each acting in conjunction with one of the N fluid inlet apertures during the entire cycle of movement of the distributor, and each comprising bosses distributed regularly and in a number equal to the inverse of the fraction of the half-flow of fluid delivered by the aperture in conjunction with which the said element acts. In one practical embodiment of the invention, the distributor is a rotary cylinder and its various elements are also cylindrical, arranged one after another in the axial direction, the fluid inlet apertures being located on a single generating line of the cylindrical body and the bosses being distributed in a regular pattern around the periphery of each of the elements.

In a further practical embodiment, the distributor is a cylinder or prism moving in the axial direction and the various elements are portions of this cylinder arranged around the periphery of the said distributor with bosses distributed regularly in the longitudinal direction, i.e. parallel to the axis, the fluid inlet apertures being then located in a single straight section of the distributor body.

The appended drawing shows two practical examples of embodiments of the valve in accordance with the invention; these embodiments are in no way limitative. In the drawing:

FIG. 1 is a view of a rotary distributor valve in axial section;

FIG. 2 is a perspective view of the distributor of the valve shown in FIG. 1;

FIG. 3 is a perspective view of the distributor of a valve with a distributor which moves in the axial direction;

FIG. 4 is a view in axial section of a valve with a distributor which moves in the axial direction, similar to that shown in FIG. 3, but with reduced length;

FIG. 5 is a sectional view along the line V—V in FIG. 4, and

FIG. 6 is a developed view of the distributor as shown in FIG. 4 or 3.

In the example shown in FIGS. 1 and 2, the valve comprises a distributor body 1 in which a cylindrical distributor 2 is mounted to rotate on shafts 3 and 3' which are trunnion-mounted in bearings 4 and 4' in the body 1.

The body 1 is a sleeve with three fluid inlet apertures 5, 6 and 7 of section such that they deliver respectively the following flow quantities $$\frac{l}{2}, \frac{l}{4}, \text{ and } \frac{l}{8}$$

where $l$ is the total delivery required from the valve. The sleeve 1 also has two fluid outlet apertures 11 and 12.

The distributor 2 consists of three cylinders 8, 9, and 10, rigidly joined together and provided with bosses in the form of ribs.

The cylinder 8 located perpendicular to aperture 5 comprises a single boss 13 which extends over half its periphery; the cylinder 9 comprises two bosses 14, 14' which each extend over one quarter of the periphery, and the cylinder 10 comprises four bosses 15, 15', 15" and 15''' which each extend over one eighth of its periphery.

The distributor 2 is driven by an electric motor which is not shown. This motor, which may be of the step type, positions the distributor 2 in rotation as a function of the order given by the numerical computer. The electrical control may of course be either of the incremental type (differential, numerical analyser) or of the conventional type with servo-control (by means of a mechanical or electrical coder).

At any given moment, the valve will supply a flow quantity proportional to the order emitted by the computer. In fact the angular positions of the cylindrical elements 8, 9 and 10 correspond respectively to the various diminishing values of the received order, 0 corresponding to closure of the fluid inlet aperture and 1 to opening of this aperture. Each rotation of the distributor by one eighth of a turn corresponds to an increase of one unit in the representative number of the order received.

In the example shown in FIG. 1, the apertures 5 and 6 are open and the aperture 7 is closed by the boss 15''' which corresponds, for the order given by the computer, to a numerical order of 110. This order was obtained by a rotation of six eights of one turn from the original position, in which the apertures 5, 6 and 7 are all blocked by the bosses 13, 14 and 15. The valve then delivers a flow quantity:

$$\frac{l}{2}+\frac{l}{4}+0=\frac{6l}{8}$$

i.e. proportional to the order given by the computer.

In the example given in FIGS. 3 to 6, the distributor 20 is a cylindrical slide moving inside the sleeve 21. The sleeve 21 has three fluid inlet apertures 22, 23, 24 located in a single sectional plane and at 120° from each other. As in the previous example, these apertures deliver respectively the flow rates:

$$\frac{l}{2}, \frac{l}{4}, \frac{l}{8}$$

The sleeve 21 also has a fluid outlet aperture 25.

The distributor 20 consists of two guide plates 26, 27 at the end and eight intermediate discs arranged next to each other 28, 29 . . . of identical thickness and provided with bosses 30, 31 . . . . These bosses are distributed in such a way that, on a peripheral sector 32 of 120°, bosses follow axially on four discs arranged next to each other while there are no bosses on the four subsequent discs, that on the following peripheral sector of 120° the bosses 33, 34 follow in groups of two discs separated by two discs without bosses, and that on the final peripheral sector of 120°, the bosses 35, 36, 37 and 38 follow each other on alternate discs.

The assembly of discs 28, 29 . . . and plates 26, 27 is carried by two coaxial shafts 40, 41, guided in bearings of the sleeve 21. The distributor 20 has an axial hole 42 which emerges at one end on the periphery 43 of the shaft 40 within the box 21 and, at the other end, through two radial passages 44, 45 on the periphery of the distributor 20, respectively between the bosses 33, 34 on the one hand between boss 34 and plate 27 on the other.

Axial movement of the distributor 20 is controlled by a motor which is not shown, for example of the step type, through the pinion 46 and the rack 47.

As in the previous example the valve delivers at any given moment a flow which is proportional to the order emitted by the computer. In the case of FIGS. 5 and 6, for example, the order emitted is the numerical order 0 1 0 and the valve delivers the flow quantity:

$$0+\frac{l}{4}+0=\frac{l}{4}$$

Since the number of cylinders which make up the distributor is relatively limited, namely in the order of 3 or 4, it is possible, when reproducing a position defined with a greater number of digits, to associate one distributor with each group of 1, 2, 3, 4 digits. Each of the distributors is controlled by the group in question independently of the others.

The valve in accordance with the invention is on the one hand extremely precise, since the precision is limited only by the level of leakage loss, there being no need for the position of the distributor to be very accurate, and on the other hand extremely rapid, thanks to the excellent performance of the electric motors; moreover the valve is extremely simple to manufacture since special care is only required for the external diameter of the distributor, no special precision being needed in the manufacture of the ribs.

What I claim is:

1. A digitally controlled flow regulating valve comprising a distributor movable within a distributor body by motor means to position the distributor as a function of an order given by a digital computer, said distributor body having at least one fluid outlet aperture and N fluid inlet apertures dimensioned to deliver clearly defined flow quantities with a loss of head which is held constant, these flow quantities being equal respectively to:

$$\frac{l}{2}, \frac{l}{2^2}, \frac{l}{2^3} \cdots \frac{l}{2^N}$$

where $l$ is the total flow from the valve and N the number of digits in the order to be received by the valve, said distributor being of cylindrical section and being provided with aperture closure members arranged in such a way that during a complete movement of the distributor the N fluid inlet apertures are opened and closed in all the $2^N$ possible combinations.

2. Valve as claimed in claim 1 in which the distributor comprises N elements arranged next to each other each element acting in conjunction with one of the N fluid inlet apertures during the entire movement of the distributor and each comprising one or more regularly distributed closure members, the number of which corresponds to the inverse of the fraction of the half-flow of fluid delivered by the aperture associated with said each element.

3. Valve as claimed in claim 1 in which the distributor is a rotatable cylinder made up of a number of cylindrical elements which are arranged coaxially in side by side relation and the fluid inlet apertures are located on a single generating line of the cylindrical body, the closure members being regularly distributed around the periphery of each of the elements.

4. Valve as claimed in claim 2, in which the distributor is movable axially and the various elements are portions of the distributor arranged around its periphery with closure members regularly distributed along its length, that is parallel to the cylinder axis, the fluid inlet apertures being located is a single cross-sectional plane of the distributor body.

5. Valve as claimed in claim 1 in which the motor means is a stepping electric motor.

References Cited
UNITED STATES PATENTS

| | | | |
|---|---|---|---|
| 3,239,142 | 3/1966 | Levine | 235—201 |
| 3,364,342 | 1/1968 | Jakubowski | 235—201 X |

M. CARY NELSON, Primary Examiner

MICHAEL O. STURM, Assistant Examiner

U.S. Cl. X.R.

137—625.41; 235—201